Patented July 11, 1933

1,917,869

UNITED STATES PATENT OFFICE

JOHN C. BIRD, OF ELIZABETH, NEW JERSEY, ASSIGNOR TO STANDARD OIL DEVELOPMENT COMPANY, A CORPORATION OF DELAWARE

RESINOUS MATERIAL FROM PETROLEUM SLUDGE

No Drawing. Application filed October 16, 1931. Serial No. 569,356.

This invention relates to the formation of resinous material. More particularly, it relates to the production of a resinous material from the sludge derived from the treatment of petroleum oil with strong sulfuric acid.

When petroleum oils, particularly the heavier hydrocarbons, are treated with strong sulfuric acid and allowed to settle, two layers are formed. The upper layer consists of the purified oil, while the bottom layer contains the so-called "acid sludge", which is generally considered to consist of sulfonic acids, excess sulfuric acid, and other organic material, some of which are in solution while others are colloidally dispersed throughout the sludge. This invention embodies treating said acid sludge in a manner which will be described, to produce resinous materials therefrom.

In a preferred form of carrying out the invention, the sludge obtained in this manner is diluted with water to a concentration of approximately 25% sludge. A mineral acid, such as hydrochloric acid, sulfuric acid, or the like is added, and the resulting mixture is heated to approximately the boiling point of water. Sodium chlorate, or any similar agent which liberates nascent chlorine is added and the chlorine thus formed reacts fairly rapidly with the sludge to form a reddish plastic body.

In another form of carrying out the invention, the sludge is heated, for example, to the boiling point of water, and treated directly with a halogen such as chlorine, bromine, or iodine. The halogen reacts with the sludge to form a soft, dark reddish to brown resinous material. It is understood that the dilution of the sludge, although preferable, is not essential.

The resinous body, when hot, is a translucent mass which is insoluble in the liquid, and is separated therefrom by skimming, or the like. It can be drawn into long silky threads which have a peculiar coppery metallic luster, and upon cooling becomes friable and readily powdered. The resulting powder, when stirred into fresh water will gradually pass into a yellow or brown colloidal suspension, being precipitated therefrom as a soft resinous body by an electrolyte such as hydrochloric acid. The substance may be dissolved in alcohol, from which, on evaporation of the solvent, reddish brown scales are obtained, having the appearance of shellac. The resin is non-inflammable, and may be used for the preparation of phonograph records, insulating media, as a constituent for moldings, and the like.

My invention is not to be limited by any theory or by the particulars given for illustration, but only by the appended claims in which it is my intention to claim all novelty inherent in my process.

I claim:

1. The method of forming resinous material from the sludge obtained in the treatment of petroleum oil with strong sulfuric acid, which comprises heating the sludge, and treating the hot sludge with a halogen.

2. The method of forming resinous material from the sludge obtained in the treatment of petroleum oil with strong sulfuric acid, which comprises heating the sludge, and treating the hot sludge with chlorine.

3. The method of forming resinous material from the sludge obtained in the treatment of petroleum oil with strong sulfuric acid, which comprises dissolving the sludge in water, heating the solution, and treating the hot sludge solution with chlorine.

4. The method of forming resinous material from the sludge obtained in the treatment of petroleum oil with strong sulfuric acid, which comprises adding mineral acid to the sludge, heating the resulting mixture, and adding to the mixture a compound capable of liberating chlorine under such conditions.

5. The method of forming resinous material from the sludge obtained in the treatment of petroleum oil with strong sulfuric acid, which comprises adding hydrochloric acid to the sludge, heating the resulting mixture and adding a chlorate to the mixture whereby the mixture is reacted upon by the chlorine.

6. The method of forming resinous material from the sludge obtained in the treatment of petroleum oil with strong sulfuric acid, which comprises dissolving the sludge in water, adding hydrochloric acid to the solution, heating the resulting mixture and adding a chlorate to the mixture whereby the mixture is reacted upon by the liberated chlorine.

7. As a new product, the resinous material formed on halogenating sludge derived from the treatment of petroleum oil with strong sulfuric acid.

8. As a new product, the resinous material formed on chlorinating sludge derived from the treatment of petroleum oil with strong sulfuric acid.

JOHN C. BIRD.